March 30, 1965

E. A. ATKISSON 3,176,222

APPARATUS HAVING COAXIAL CAPACITOR STRUCTURE
FOR MEASURING FLUID DENSITY

Filed April 19, 1961

INVENTOR
EUGENE A. ATKISSON

BY

ATTORNEY

United States Patent Office 3,176,222
Patented Mar. 30, 1965

3,176,222
APPARATUS HAVING COAXIAL CAPACITOR STRUCTURE FOR MEASURING FLUID DENSITY
Eugene A. Atkisson, Fairview Park, Ohio, assignor to the United States of America as represented by the Administrator of the National Aeronautics and Space Administration
Filed Apr. 19, 1961, Ser. No. 104,187
1 Claim. (Cl. 324—61)
(Granted under Title 35, U.S. Code (1952), sec. 266)

The invention described herein may be manufactured and used by or for the Government of the United States of America for governmental purposes without the payment of any royalties thereon or therefor.

This invention relates generally to densitometers, and more particularly to an apparatus for measuring the density of compressible liquids or gases or mixtures thereof.

For most incompressible liquids, the mere measurement of the temperature of a liquid is sufficient to determine its density and obviously does not pose a problem in this respect. For compressible fluids, however, it becomes necessary to know both the temperature and pressure in order to accurately determine the density thereof. A prevalent example of this category is a compressible liquid such as liquid hydrogen. Prior to this invention, it was necessary to take the aforesaid temperature and pressure measurement individually in the fluid of which the density determination was desired, and then from the data determine the density. These methods obviously do not directly relate the phase of the material in the system and entail complications.

The basis of the problem is the fact that compressible fluids particularly, as well as some incompressible fluids, often exist simultaneously in both liquid and gaseous phases. Since the density of each phase is different, it is normally necessary to take temperature and pressure readings of the gaseous phase and liquid phase separately in order to determine the density of the fluid. This, of course, is a quite complicated procedure and does not lend itself to rapid and accurate measurements.

Clausius and Mosotti found a relation between the dielectric constant of a material and its density. This relation is $\epsilon - 1/\epsilon + 2 = a\rho$, where $\epsilon$ is the dielectric constant, $a$ is the molecular polarizability constant for the particular material, and $\rho$ is the absolute density of the material. Additionally, $\epsilon = C_1/C_0$ where $C_0$ is the capacitance of a capacitor when there is a vacuum between the plates and $C_1$ is the capacitance when the fluid being measured is between the plates. Theoretically, this relation holds for all nonpolar materials regardless of phase.

By placing an air-dielectric capacitor in a fluid, a change of capacitance will be observed. This capacitance is the aforementioned $C_1$. The magnitude of this change is a function only of the desnsity of the material. Since capacitance can be measured accurately and rapidly, this method provides a practical means of density measurement.

Briefly, this invention concerns a device and method for measuring the density of fluids, particularly those simultaneously existing in both the liquid and gaseous phases. Basically, the densitometer device consists of a series of plates comprising an air dielectric capacitor which is placed in the fluid to be measured. The fluid that thus fills the space between the plates of the capacitor causes a change in the capacitance which is recorded by an indicator af a bridge circuit which is connected to the capacitor. Using the Clausius and Mosotti relationship, the indicator can be calibrated to read density directly, though the capacitor is actually measuring change of capacitance. It can be seen that the indicator must be calibrated separately for each material to be measured since, in general, no two materials have the exact same molecular polarizability constant $a$. Additionally, it is pointed out that the densitometer records equally well in either a static or flow system, the flow of the fluid having no effect upon the measuring ability of the device.

An object of the invention is to provide a device for the direct measurement of density of fluids existing simultaneously in both liquid and gaseous phases.

An additional object of the present invention is to provide for the accurate measurement of density of fluids.

A further object of the invention is to provide a device for the direct measurement of the density of fluids, which device has no moving mechanical parts.

A still further object of the instant invention is to provide a device for the direct density measurement of fluids, which device may be used in either a flow line or a static system.

One other object of the invention is to provide a device for the rapid density measurement of fluids.

Still another object of this invention is to provide a novel method for determining the density of fluids.

Other objects and many attendant advantages of the present invention will be apparent from the following detailed description when taken together with the accompanying drawings in which.

Figure 1:
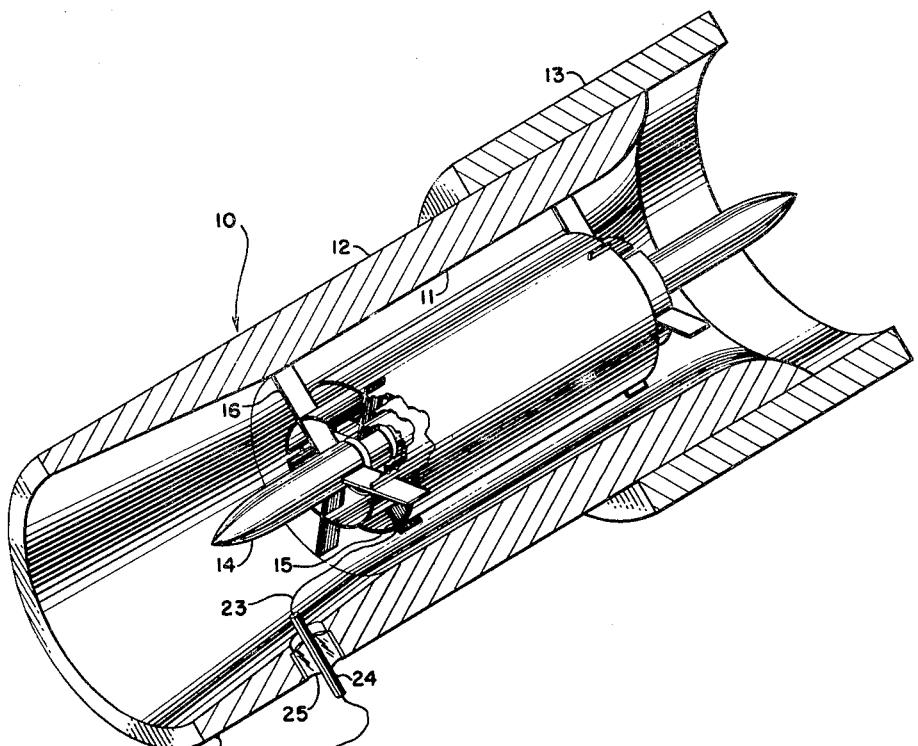
FIG. 1 is a partially-sectioned pictorial view of the densitometer device of this invention shown in relation to a pipeline.

Referring now to the drawings wherein like reference numerals designate like or corresponding parts throughout the several views, there is shown in FIG. 1 a probe 10 comprising a sleeve having an outer tubular-shaped surface or shell 12 having a venturi-shaped inner surface or wall 11. The particular venturi shape of the internal contour of the shell 12 is not pertinent to the invention and the inside wall of the shell may be completely straight. The probe 10 is shown positioned within a normal feedline 13 wherein a liquid would flow through the probe to the feedline 13. However, since the probe 10 is symmetrical, the direction of fluid flow in relation to either end of it is not important to the use of the device.

Figure 2:
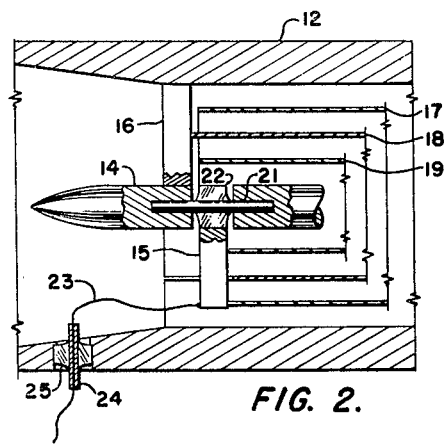
FIG. 2 is a sectional view of the densitometer device of the invention.

Referring now to FIG. 2 in combination with FIG. 1, the probe 10 is shown as having a capacitor assembly consisting of a concentric configuration of plates 17, 18 and 19 which are electrically insulated from each other. These plates are cylindrical sheets of metal with plate 18 being supported by a plurality of equidistantly-spaced radially-outward extending arms 16, while plates 17 and 19 are held in position through the support arms 15. Additionally, the shell 12 and the centerbody 14 serve as part of the capacitor assembly, these two members comprising together with the plate 18 a ground potential for the capacitor assembly of the densitometer. Support arms 15, which as previously discussed hold plates 17 and 19, are electrically insulated from the centerbody 14 and thus are insulated from all the ground members of the capacitor assembly by means of a conventional glass-metal seal 22. A small metal rod 21 serves to suspend the glass-to-metal seal 22 and the support arms 15 between the centerbody 14. An electrical conductor 23 is connected to the support arms 15 and is directed out from the probe through an insulated sleeve 24 disposed in a radial aperture formed in the shell 12 of the densitometer by means of a glass-to-metal seal 25. The conductor 23 and shell 12 are connected in an arm of a conventional bridge circuit, such for example, as a bridge 27 having a power source 28 and an indicator 29 so that the dielectric constant of the material can be measured. The indicator is calibrated to indicate density rather than the dielectric constant which is a direct function of the density, the relationship found by Clausius and Mosotti.

It is not necessary that the capacitor employ only concentric cylinders. Flat parallel plates may be used in place of these cylinders or other arrangements can be used to fit a particular flow system requirement. Additionally, the signal from the probe can be used to energize a pressure transducer indicating volumetric flow so that the signal produced by the pressure transducer will indicate mass flow directly.

Obviously, many modifications and variations of the present invention are possible in the light of the above teachings. It is, therefore, to be understood that within the scope of the appended claim the invention may be practiced other than as specifically described.

What is claimed is:

Apparatus for measuring fluid density comprising, a tubular casing having a venturi-shaped inner surface, a centerbody spaced from said inner surface within said casing, a plurality of spaced plates interposed between said centerbody and said inner surface, a plurality of members extending inwardly from said inner surface for rigidly mounting said centerbody along the axis of said casing, said members being in electrical contact with at least one of said plates for mounting the same in coaxial relationship with said centerbody and forming the ground potential of a capacitor assembly, a plurality of support arms extending outwardly from said centerbody toward said inner surface for electrically connecting the remainder of said plates and mounting the same in coaxial relationship with said centerbody thereby forming the remainder of said capacitor assembly, means for electrically insulating said support arms from said centerbody, means for electrically connecting said capacitor assembly to one arm of a capacitance bridge circuit, and an indicator coupled in said bridge and calibrated to read density correlative to the capacitance variation in said bridge.

References Cited by the Examiner
UNITED STATES PATENTS

| | | | |
|---|---|---|---|
| 2,349,992 | 5/44 | Schrader | 324—65 |
| 2,599,583 | 6/52 | Robinson et al. | 324—61 |
| 2,800,628 | 7/57 | Stinson et al. | 324—61 |
| 2,834,338 | 5/58 | Carson | 324—61 X |

WALTER L. CARLSON, *Primary Examiner.*